United States Patent [19]

Toyoshima et al.

[11] Patent Number: 4,997,796
[45] Date of Patent: Mar. 5, 1991

[54] GLASS FOR MAGNETIC HEAD

[75] Inventors: Fumitoshi Toyoshima, Nishiyama; Noriyo Nagumo, Nagaoka, both of Japan

[73] Assignee: Alps Electric Co., Ltd., Tokyo, Japan

[21] Appl. No.: 461,131

[22] Filed: Jan. 4, 1990

[30] Foreign Application Priority Data

Apr. 5, 1989 [JP] Japan ................... 1-86168

[51] Int. Cl.$^5$ ............................................ C03C 3/072
[52] U.S. Cl. ..................................................... 501/75
[58] Field of Search ......................................... 501/75

[56] References Cited

U.S. PATENT DOCUMENTS

| | | | |
|---|---|---|---|
| 3,418,156 | 12/1968 | Medert et al. | 501/75 |
| 3,735,052 | 5/1973 | Hoogendoorn et al. | 360/122 |
| 3,838,071 | 9/1974 | Amin | 106/1.14 |
| 3,886,025 | 5/1975 | Riseman | 156/325 |

FOREIGN PATENT DOCUMENTS 0206330 8/1988 Japan .

Primary Examiner—Mark L. Bell
Assistant Examiner—Deborah Jones
Attorney, Agent, or Firm—Guy W. Shoup; Paul J. Winters

[57] ABSTRACT

A kind of glass for magnetic head having a property of absorption of light and a property of adhesion in the molten state is produced as follows: CuO and $Cr_2O_3$ are added to the glass of $PbO-B_2O_3-SiO$ phase in order to increase the absorption rate from a laser beam. $TeO_2$ is added in order to decrease the viscosity of the molten material and to increase the molten viscosity and the wettability to ceramics and ferrite which are bonded. It can be used in the fabrication of the magnetic head and the floating magnetic head. In particular the glass melts easily when irradiated by a xenon arc beam and other lasser beams.

1 Claim, No Drawings

GLASS FOR MAGNETIC HEAD

BACKGROUND OF THE INVENTION

1. Field of the Invention

In this invention a kind of glass material having a property of absorption of light and a property of adhesion in the molten state is introduced for bonding a ferrite magnetic head core to a ceramic slider of a magnetic head assembly. The glass can be used in the fabrication of the magnetic head and a floating magnetic head. Particularly, the glass is easy to melt by irradiating with a xenon arc beam and other laser beams.

2. Description of the Prior Art

Up to now glass as a filler material is used to fill the space between the main body of magnetic head and the magnetic head core which is made of ferrite. Moreover, the conventional glass is used to fix the core to the main body of the magnetic head.

For this reason for example, a compound consisting of 72.0–77.0 wt. % of PbO, 5.5–11.0 wt. % of $B_2O_3$ and 3.0–10.0 wt. % of $SiO_2$ forms a glass of PbO—$B_2O_3$—$SiO_2$ phase.

But when the glass of PbO—$B_2O_3$—$SiO_2$ phase is heated and melted using irradiation with a xenon arc beam and other laser beams, due to the conventional glass having a low absorption rate of light and low transfer efficiency from light energy to heat energy.

Another disadvantage of the conventional glass is that the glass of PbO—$B_2O_3$—$SiO_2$ phase possesses a high viscosity and has poor wettability to ferrite and ceramic. As a result, the glass coating is uneven.

SUMMARY OF THE INVENTION

According to the present invention a glass for use on a magnetic head having a property of absorption of light and a property of adhesion in a molten state is produced as follows: CuO and $Cr_2O_3$ are added to the glass of PbO—$B_2O_3$—$SiO_2$ phase in order to increase the absorption rate from a laser beam and $TeO_2$ is added to decrease the viscosity of the molten material. Accordingly, the problem as above mentioned is solved.

DETAILED DESCRIPTION OF THE INVENTION

Firstly, a glass for a magnetic head having a property of absorption of light and a property of adhesion in the molten state is described. The glass is formed by addition of CuO and $Cr_2O_3$ to the glass of PbO—$B_2O_3$—$SiO_2$ phase.

The composition range of this kind of glass is as follows:
PbO: 48.0–63.0 wt. %,
$B_2O_3$: 20.0–28.0 wt. %,
$SiO_2$: 4.5–7.0 wt. %,
CuO 6.0 wt. %,
$Cr_2O_3$ 1.0 wt. %.

In addition, the glass may have minor amounts of $Al_2O_3$ and MgO etc. present and still be within the scope of the present invention.

The reason for the limitation of the composition range is as follows:

When the content of PbO is less than 48.0 wt. %, the melting temperature of the glass will increase with the increase of the viscosity. It is unfavourable. If the PbO content is over 63.0 wt. %, the resistance to environmental changes will get worse. It is also unfavourable.

When $B_2O_3$ is over 28.0 wt. %, the glass material is comparatively stable but the gradient of the viscosity characteristic curve tends to be gentle and then the difference between its freezing temperature and melting temperature becomes large. So it is also unsuitable.

When the content of $SiO_2$ is less than 4.5 wt. %, the melting temperature tends to decrease but the glass easily crystallizes and the reactivity, of the glass with other materials becomes stronger. It is unfavourable. When $SiO_2$ content is over 7.0 wt. %, the melting temperature increases and the coefficient of thermal expansion decreases. So it is also unfavourable.

When the content of CuO is over 6.0 wt. %, crystallization occurs during the solidification of the glass and the transparency of the glass becomes worse. So it is unsuitable.

When the content of $Cr_2O_3$ is over 1.0 wt. %, the transparency of the glass also tends to be worse. It is unsuitable too.

The characteristics of the glass as mentioned above are as follows: the coefficient of thermal expansion is $(90-105) \times 10^{-7}/°C$. The vitrification temperature is $380°-440°$ C. Its softening temperature is $420°-500°$ C. When the wave length is 1064 nm, the coefficient of transparence rate of light is between $(0.8-2.2)$ $mm^{-1}$. The coefficient of transparence rate is $$\epsilon = -(\log P)/t.$$

Where, t=plate depth (mm) penetrated by light. P=transparence rate $\times 100(\%)$. In particular the absorption rate of light is very strong, so that the glass for a magnetic head, having a property of absorption of light and property of adhesion in a molten state, can effectively change the light energy of a laser to thermal energy. Thus, a small output laser device can be employed and the irradiation time can also be shortened. Further, compared with the glass of PbO—$B_2O_3$—$SiO_2$ phase without CuO and $Cr_2O_3$, it can be melted at a lower temperature.

Secondly, the glass for a magnetic head having the properties of absorption of light and adhesion in a molten state, $TeO_2$, CuO and/or $Cr_2O_3$ are added in the glass of PbO—$B_2O_3$—$SiO_2$ phase.

The composition range of this kind of glass is as follows:
PbO=45.0–62.0 wt. %
$B_2O_3$=15.0–22.0 wt. %
$SiO_2$=2.0–6.0 wt. %
$TeO_2$=5–27 wt. %
CuO 6.0 wt. %
$Cr_2O_3$ 1.0 wt. %

In addition, the glass may have minor amounts of $Al_2O_3$ and MgO etc. present and still be within the scope of the present invention.

The reason for the limitation of the composition is as follows:

When the content of PbO is less than 45.0 wt. %, the melting temperature of the glass will increase with increasing viscosity. It becomes unfavourable. When over 62.0 wt. %, the resistance to environmental changes will get worse. It is also unfavourable.

When the content of $B_2O_3$ is less than 15.0 wt. %, the glass crystallizes easily and the glass becomes difficult to produce. So it is unsuitable. When over 22.0 wt. %, the glass material is comparatively stable but the gradient of the viscosity characteristic curve tends to be gentle and then the difference between its freezing temperature and melting temperature becomes large. So it is also unsuitable.

When the content of $SiO_2$ is less than 2.0 wt. %, the melting temperature tends to decrease but the glass crystallizes easily and the reactivity of the glass with other materials becomes stronger. It is unfavorable. When the content of $SiO_2$ is over 6.0 wt. %, the melting temperature increase and the coefficient of thermal expansion decreases. So it is unfavourable too.

When the content of CuO is over 6.0 wt. %, crystallization will occur during the solidification of the glass and the transparency of the glass becomes worse. So it is unsuitable.

When the content of $Cr_2O_3$ is over 1.0 wt. %, the transparency of the glass also tends to be worse. It is unsuitable too.

When the content of $TeO_2$ is less than 5.0 wt. %, the glass can not decrease the viscosity of molten glass. The highly viscous glass can cause damage to the materials which are bonded in the molten state. It is unsuitable. When the content of $TeO_2$ is over 27 wt. %, its corrosion resistance gets worse. So it is also unsuitable.

The characteristics of the glass with above-mentioned composition are as follows:

The coefficient of thermal expansion is between $(86-105) \times 10/°C$. Its softening temperature is 390°–480° C. and the vitrification temperature is 350°–450° C. When light having a wave length of 1064 nm applied to the glass, the coefficient of transparence rate is between $(1.5-2.25)$ $mm^{-1}$. The coefficient of transparence is represented by $\epsilon = -(\log P)/t$, where t=plate depth(mm) penetrated by light. P=transparence rate$\times 100(\%)$.

The glass according to the present invention is obtained by adding $TeO_2$ in the glass of PbO—$B_2O_3$—$SiO_2$ in order to decrease its viscosity in the molten state, to increase the wettability of the glass to ceramics and ferrite which are bonded and to increase the molten viscosity. Moreover, the corrosion resistance of the glass contains $TeO_2$ is excellent.

The present invention is described according to the example as follows:

EXAMPLE

After PbO-52.5 wt. %, $B_2O_3$-19.0 wt. %, $TeO_2$-19.0 wt. %, MgO-1.5 wt. %, $Al_2O_3$-1.5 wt. %, $SiO_2$-5.0 wt. %, CuO-1.0 wt. %, $Cr_2O_3$-0.5 wt. %, are mixed together, the mixture is put in a platinium crucible and heated at 1000° C. for 5 hours in air. When the mixture melts, the glass can be made. The glass made as above possesses the following properties:

The coefficient of thermal expansion is $96.6 \times 10/°C$.
The vitrification temperature is 417° C.
The softening temperature is 450° C.
The coefficient of transparence rate of light is 1.44 mm.

The Nd:YAG laser device with 1064 nm wave length is adapted.

$$\epsilon = -(\log P)t$$

Where,
t=Plate depth (mm) of glass penetrated by light.
P=transparence rate$\times 100(\%)$ A glass fiber having a diameter of 0.1 mm. is drawn from the molten glass which consists of the above-mentioned compounds.

When this glass fiber is irradiated for 4 seconds the Nd:YAG laser device (wave length: 1064 nm, power output: 1048 W., focal diameter:0.1 mm) the glass melts immediately and can adhere to ceramics etc.

In addition, by means of the above-mentioned laser device, the glass fiber in the molten state can be also used to adhere together the slider and the ferrite chip core of the magnetic head. The laser output power of 1.5 W. is quite enough to achieve the adhesion. The probability of cracking between the adhered parts is 2.5%.

Furthermore, a glass fiber having a diameter of 0.1 mm. consists of the following compounds:

PbO: 65.7 wt. %
$B_2O_3$: 24.8 wt. %
MgO: 1.5 wt. %
$Al_2O_3$: 1.5 wt. %
$SiO_2$: 5.0 wt. %
CuO: 1.0 wt. %
$Cr_2O_3$: 0.5 wt. %

If this kind of glass fiber is used to stick the slider and the ferrite chip core of the magnetic head, a laser output power of about 4.5 W. is sufficient and the probability of cracking between the adhered parts is 100%.

The transition temperature of the glass, as mentioned above, is 409° C. the coefficient of thermal expansion is $95.2 \times 10/°C$. and the coefficient of transparence rate of light is 1.01 $mm^{-1}$.

From the above description, the glass has a strong light absorption, it can effectively transfer the light energy of a laser into thermal energy and it is shown that the glass has a good absorption of light and adhesion in the molten state. The wettability of the glass to the materials to be bonded is strong. The coefficient of thermal expansion is small. The corrosion resistance is excellent. Hence, as a filler material in the space of magnetic head, it is very suitable.

We claim:
1. A glass for a magnetic head having a property of absorption of light, a property of adhesion in a molten state, and having a PbO—$B_2O_3$—$S_iO_2$ phase consisting essentially of $TeO_2$ in a range of 5 to 27 weight percent CuO in an amount of 6 weight percent; and $Cr_2O_3$ in an amount of 1.0 weight percent.

* * * * *